United States Patent [19]

Ingalz

[11] Patent Number: 4,936,508

[45] Date of Patent: Jun. 26, 1990

[54] SHOWER HEAD VOLUME METER WITH ALARM SIGNAL

[76] Inventor: Thomas J. Ingalz, 1528 Hallcrest Dr., San Jose, Calif. 95118

[21] Appl. No.: 346,525

[22] Filed: May 2, 1989

[51] Int. Cl.$^5$ .............................................. G01F 1/115
[52] U.S. Cl. ........................................ 239/72; 340/610; 137/551
[58] Field of Search .................. 239/68, 72, 74, 240; 73/DIG. 4, 861.78; 340/606, 609, 610; 222/39; 137/551

[56] References Cited

U.S. PATENT DOCUMENTS

| | | | |
|---|---|---|---|
| 3,534,602 | 10/1970 | Boyd | 73/861.78 |
| 3,647,115 | 3/1972 | McCann et al. | 222/39 |
| 3,762,440 | 10/1973 | Bryant | 137/551 |
| 3,845,291 | 10/1974 | Portyrata | 340/606 X |
| 4,101,874 | 7/1978 | Denison et al. | 340/606 |
| 4,122,381 | 10/1978 | Sturm | 320/48 |
| 4,206,643 | 6/1980 | Phillips et al. | 73/206 |
| 4,262,842 | 4/1981 | Grover, Jr. et al. | 235/92 |
| 4,280,530 | 7/1981 | Yi | 239/68 X |
| 4,330,089 | 5/1982 | Finkbeiner | 239/383 |
| 4,346,844 | 8/1982 | Harmony | 239/383 |
| 4,395,919 | 8/1983 | Peters | 73/861.77 |
| 4,520,516 | 6/1985 | Parsons | 4/623 |
| 4,520,677 | 6/1985 | Macko et al. | 73/861 |
| 4,662,539 | 5/1987 | Komukai | 222/39 X |
| 4,668,889 | 5/1987 | Adams | 73/DIG. 4 X |
| 4,700,579 | 10/1987 | Hall | 73/861.78 |
| 4,720,800 | 1/1988 | Suzuki et al. | 364/510 |
| 4,790,036 | 12/1988 | Vogeli et al. | 4/233 |

OTHER PUBLICATIONS

Darold Wobschall, "Circuit Design for Electronic Instrumentation", 2nd ed.; publ. by McGraw Hill, 1987, Chapter 8, pp. 127-129.

"Sporting Edge Presents" Catalog, Bothell, Washington, Mar. 1989.

*Primary Examiner*—Andres Kashnikow
*Assistant Examiner*—William Grant
*Attorney, Agent, or Firm*—Thomas Schneck

[57] ABSTRACT

A shower head volume meter producing an audible or other alarm for indicating when a predetermined volume of water has been delivered. A polite alarm or "beep" is used after a first volume of water y has been delivered, while an aggressive alarm in the form of a continuous sound is used after a second volume of water y+z has been delivered. A first embodiment measures the volume of water with a magnetic turbine and pick-up coil. The turbine rotates in response to water flow through meter generating a rotating magnetic flux. The flux lines cut across the pick-up coil which produces electrical pulse signals at a rate corresponding to the water flow rate. The number of magnetic poles in the turbine determines the total volume of water that can be delivered. A microcontroller analyzes the pulse signals and initiates the alarm. The pick-up coil doubles as an alternator to produce electrical power for the microcontroller. A second embodiment measures the volume of water using the pressure difference caused by the venturi effect. A piezoresistive die produces a voltage corresponding to the water flow rate. The meter can be a separate screw or adapter or an integral part of the shower head.

11 Claims, 5 Drawing Sheets

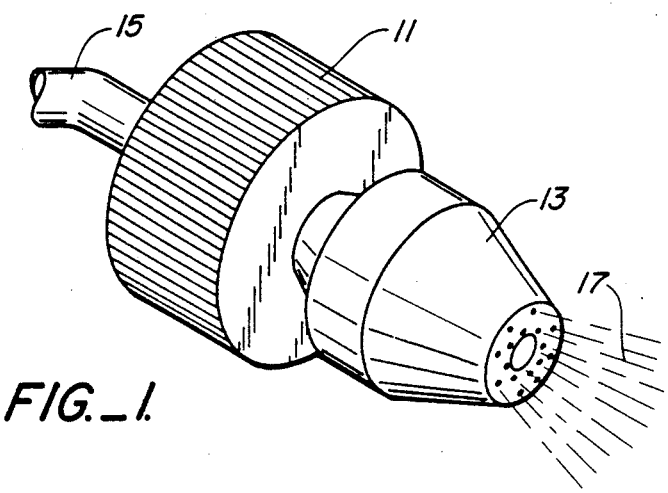
FIG._1.
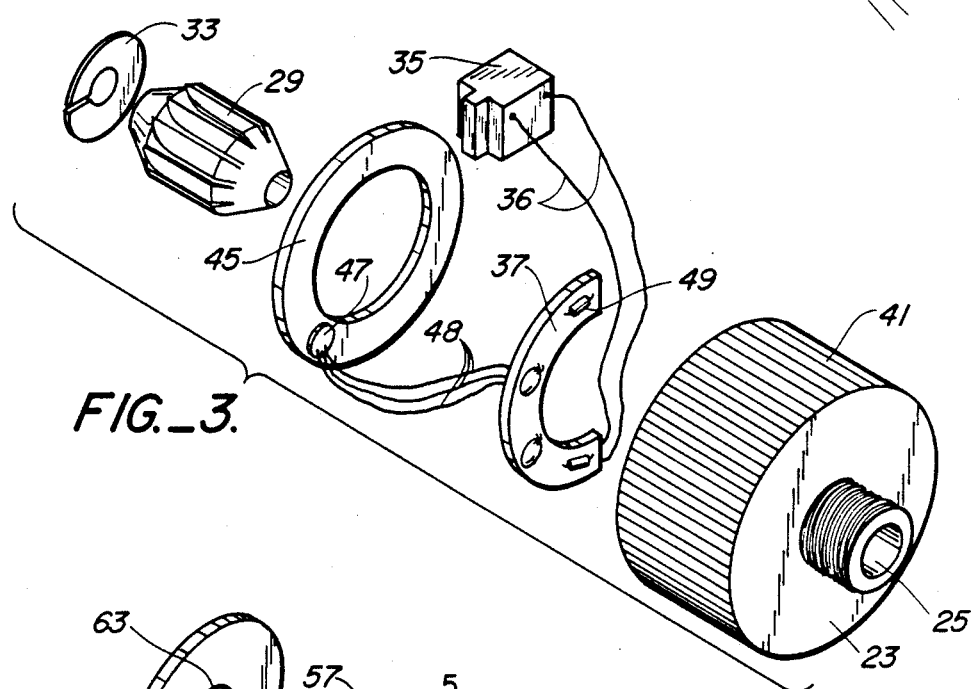
FIG._3.
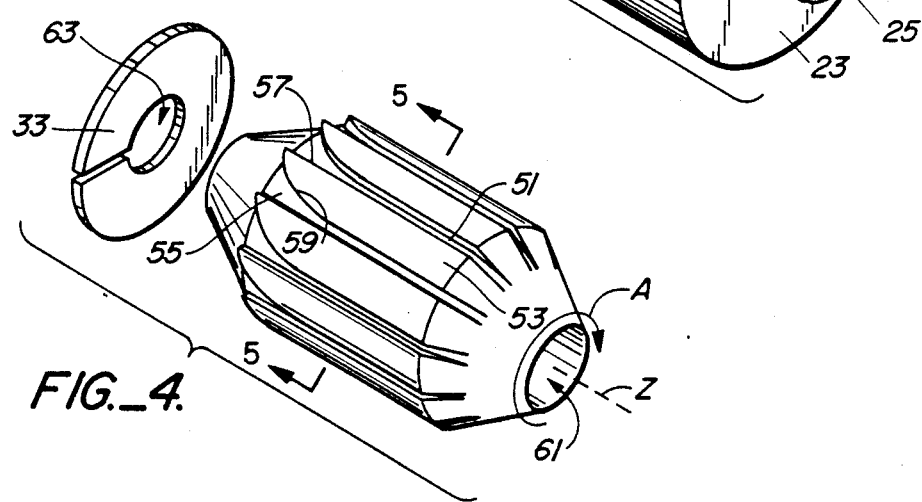
FIG._4.

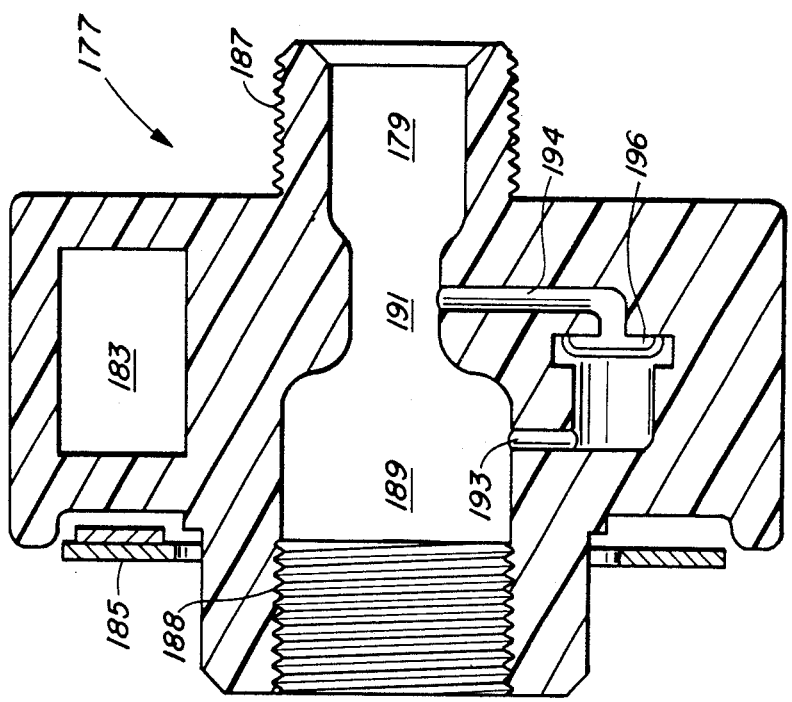
FIG._10.
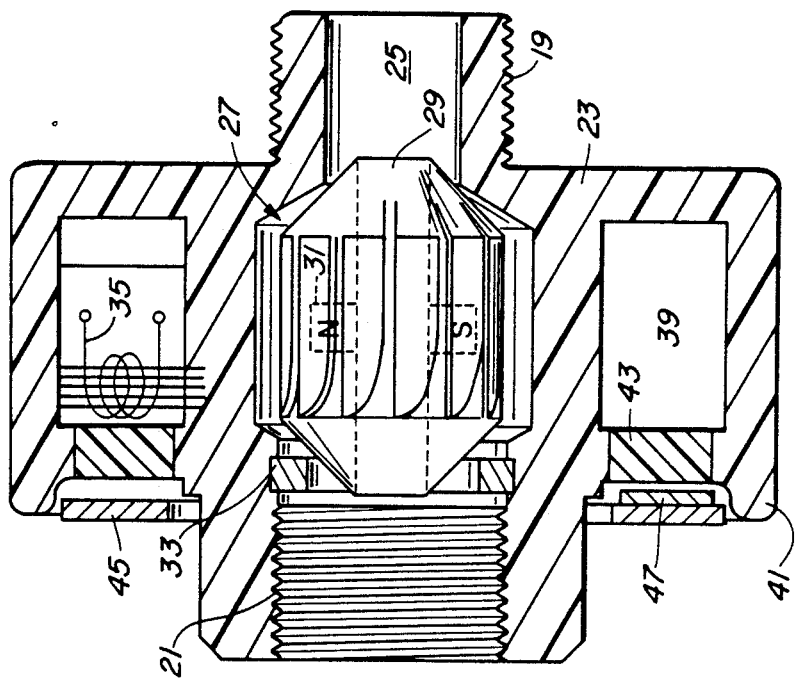
FIG._2.

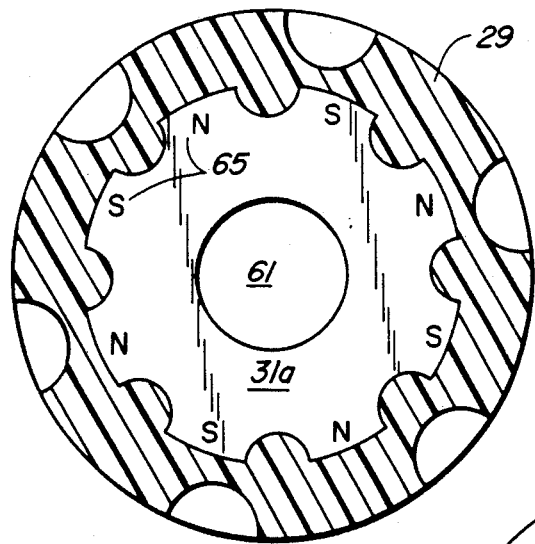
FIG._5.
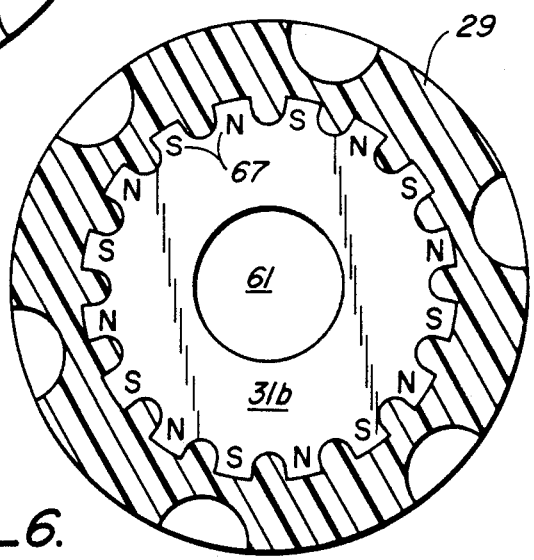
FIG._6.
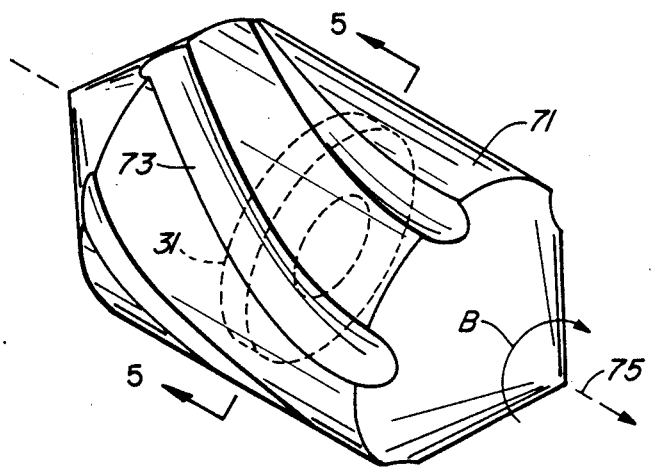
FIG._7.

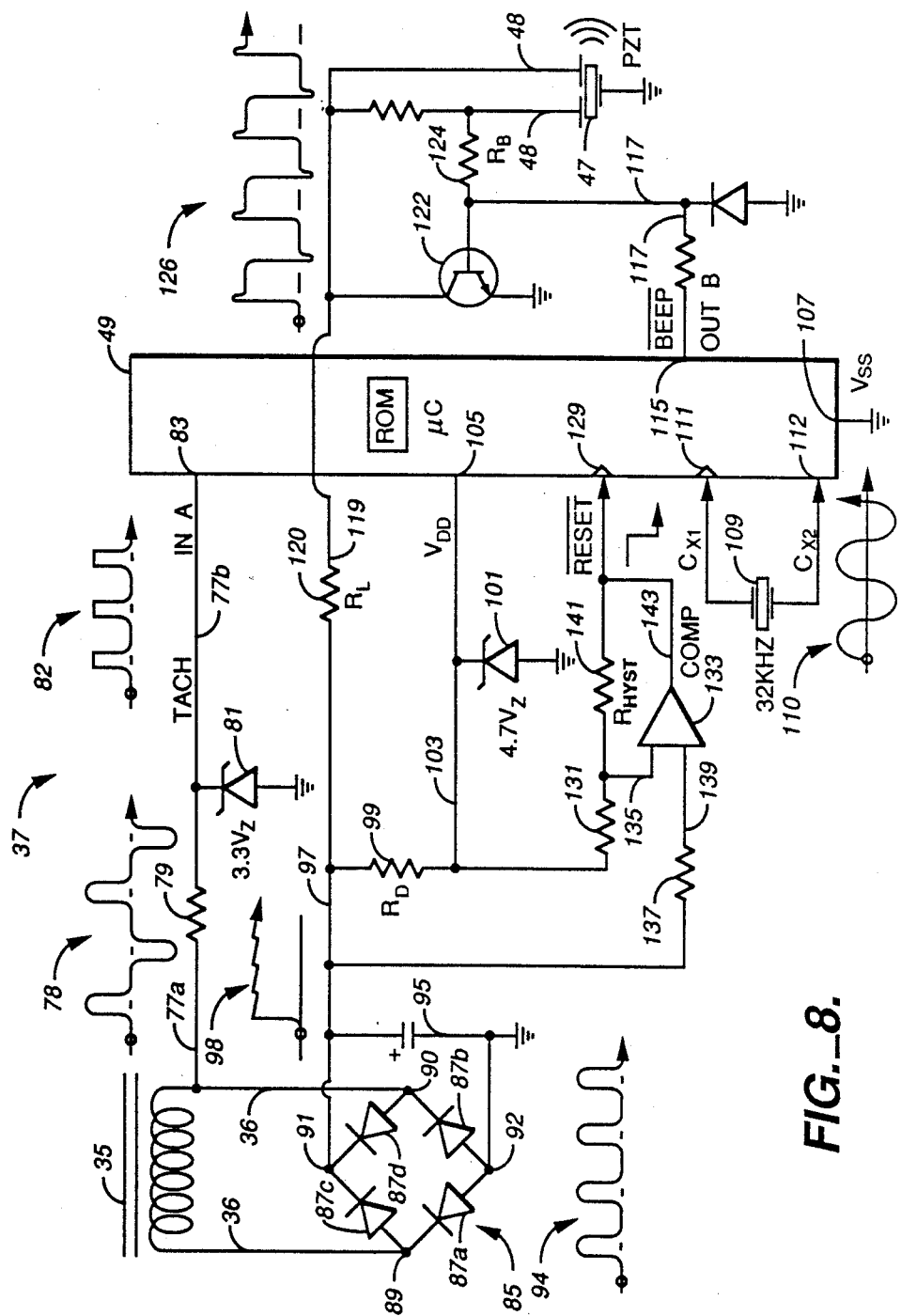
FIG._8.

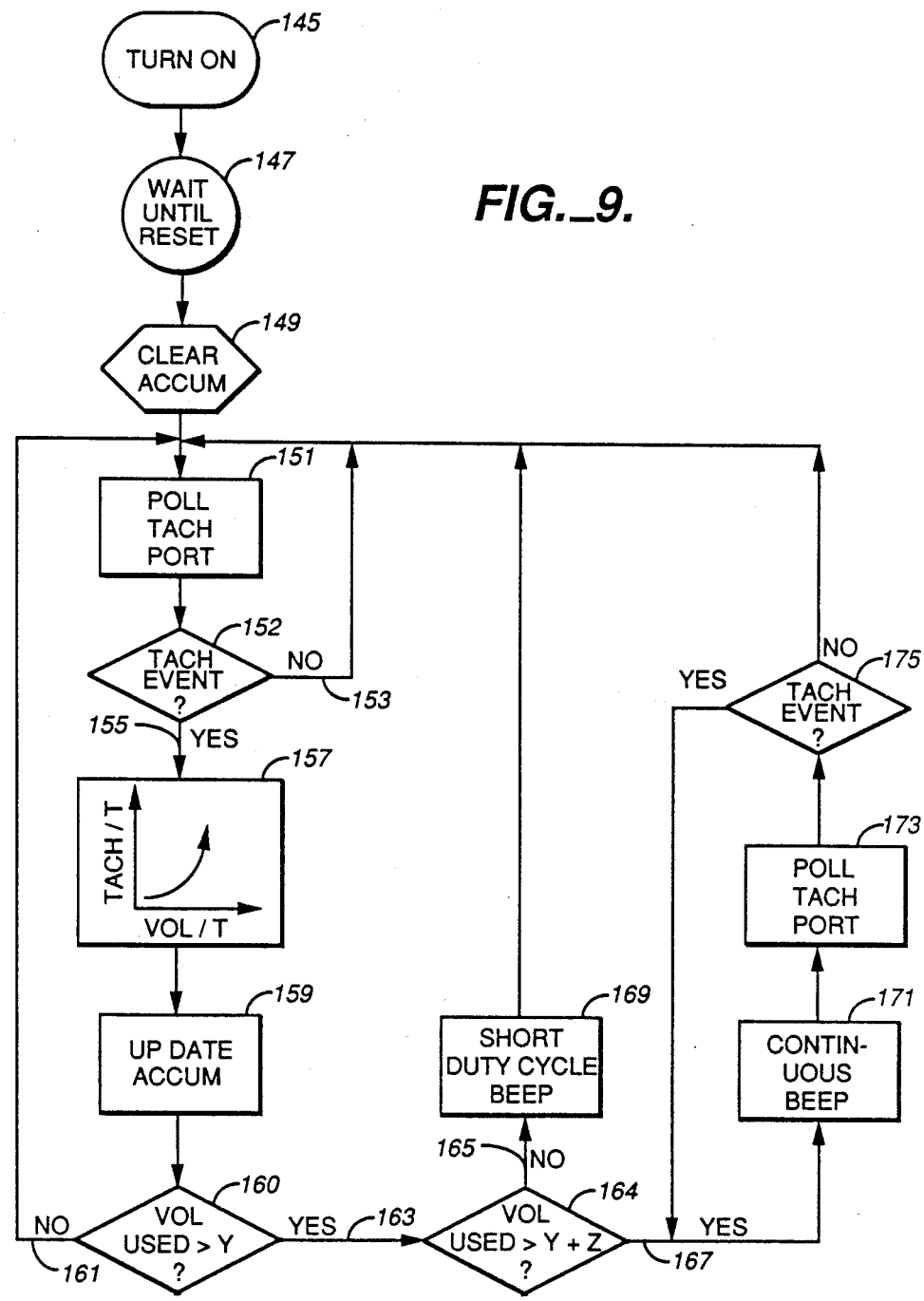
FIG._9.

SHOWER HEAD VOLUME METER WITH ALARM SIGNAL

TECHNICAL FIELD

The present invention relates to fluid spraying or dispensing with volume metering, and in particular to volume meters for shower heads and the like with spray quantity indicating or alarm means.

BACKGROUND ART

Many parts of this country, even of the world, experience occasional droughts which call for voluntary cutbacks of water usage or when the drought is serious, rationing of water. In normally arid regions, such as the western United States, water conservation is a fact of life, even in years with average rainfall amounts. Unfortunately, water conservation is practiced inconsistently and unevenly. Water districts and utilities periodically make public service announcements reminding people not to waste water. Some even distribute water conservation kits including shower flow restrictors, new spigot seals, and toilet reservoir displacement packs.

One common method of conserving water in a shower is the use of shower head flow restrictors. Compared to standard shower heads, those with flow restrictors deliver water at a reduced rate while attempting to maintain the shower's spray force. One such shower head is disclosed in U.S. Pat. No. 4,346,844 to Harmony. This shower head features the addition of air into the water stream to reduce the amount of water flow. The stream is then split into a cone shaped spray and a pulsating spray, the latter serving to maintain the peak spray force.

Unfortunately, many people quickly discontinue use of restricted flow shower heads in favor of standard flow shower heads. These people apparently are dissatisfied with the "feel" of the restricted flow, even when compensated for by a pulsing action Further, many restricted flow shower heads tend to be inefficient in their ability to rinse soap from the body, leaving their users dissatisfied long after the shower is over. Even when people continue to use the restricted flow shower heads, the length of the shower tends to increase over time until, in the end, little overall water savings result.

Another shower conservation tool used by some is a timer. One such timer is shown in U.S. Pat. No. 4,262,842 to Grover, Jr. et al. A problem with timers is that they are not always an accurate measure of actual water use. Most do not take into account the water flow rate or the practice of some people of turning water off during shampooing and back on for rinsing. Some with flow meters measure only hot water usage. Others with reset features can be fooled easily.

Most water meters only indicate the volume delivered with a numerical readout or dial. These can easily be ignored, particularly when a user's back is to the readout, and can also be misread, particularly by people who take their eyeglasses off when showering. Many water meters are bulky, making them unsuitable for use with a shower, and do not have a reset, making calculation of water use more difficult and error prone.

An object of the present invention is to provide a shower volume meter which accurately measures water use and which urges people to conserve water.

DISCLOSURE OF THE INVENTION

The above object has been met with a volume meter for a fluid dispenser, such as a shower head, in which volume flow is measured and a user is audibly signaled when a predetermined amount of water has been dispensed. The meter includes means within a flow path for measuring the volume flow, a means for calculating and comparing the measured volume versus some desired total volume, and alarm means for indicating when the predetermined desired volume has been dispensed. Preferably, the measuring means is a turbine with magnetic inserts, with helical channels formed in the circumferential surface of the turbine, and with an axial through hole that allows the turbine to float freely in the flow path. The turbine rotates in response to water flow generating a rotating magnetic flux at a rate corresponding to the flow rate. The measuring means also includes a coil pickup producing electrical pulse signals in response to the received magnetic flux. The pickup doubles as an alternator which generates electrical power for a processor and audible alarm.

Typically, a first alarm signal would be produced when a first quantity of water has been dispensed and a second, more aggressive, alarm signal when a second quantity of water has been dispensed. A preferred alarm signal is an audible signal in the form of polite beeps and continuous tones.

By measuring water volume directly, instead of inferring volume use with timer, an accurate measure is obtained whether a flow restrictor is in place or not. The alarm, first politely then more aggressively, prompts the water user to finish showering and may be interpreted as a challenge to use less water. By basing the alarm signal on the basis of water volume delivered, instead of a timer, the shower user is allowed a full range of shower flow choices, restricted or unrestricted flow, while being assured of his or her contribution to water conservation.

BRIEF DESCRIPTION OF THE DRAWINGS

FIG. 1 is a perspective view of a shower head with an attached volume meter adaptor.

FIG. 2 is a side sectional view of the volume meter adaptor of FIG. 1.

FIG. 3 is an exploded view of the volume meter adaptor of FIG. 1.

FIG. 4 is a perspective view of a magnetic turbine and retaining ring of the volume meter adaptor of FIG. 1.

FIG. 5 is a front section of the magnetic turbine of FIG. 4 taken along the line 5—5 and showing a first magnetic insert embodiment thereof.

FIG. 6 is a front section of the magnetic turbine of FIG. 4 taken along the line 5—5 and showing a second magnetic insert embodiment thereof.

FIG. 7 is a perspective view of an alternative magnetic turbine embodiment of the volume meter adaptor of FIG. 1.

FIG. 8 is an electrical circuit schematic of the volume meter adaptor's electronics.

FIG. 9 is a flow diagram of the programmed routine of the microcontroller of electrical circuit of FIG. 8.

FIG. 10 is a side sectional view of an alternative volume meter adaptor.

BEST MODE FOR CARRYING OUT THE INVENTION

With reference to FIG. 1, a volume meter 11 connects to a water shower head 13, for example by screwing the shower head 13 onto a standard male water pipe thread 19, seen in FIG. 2, of the volume meter 11. The volume meter 11 also connects to a shower water pipe "neck"15, for example by screwing onto the male water pipe thread of the neck. As seen in FIG. 2, the volume meter 11 has a standard female water pipe thread 21 to receive the thread of the pipe neck 15. Water is delivered by neck 15 through the volume meter 11 to shower head 13 from whence it is dispensed as a spray 17.

While the volume meter 11 is shown as a separate adapter element from the shower head 13, the volume meter 11 can be an integral part of a shower head. A separate volume meter which can be connected between the neck 15 and shower head 13 is preferred, however, because it can be used with existing shower head designs of both the standard and water conservation variety. Further, while the volume meter 11 is shown as a shower head adaptor, it can also be used with other water dispensing applications, such as on a garden hose, or bathroom or kitchen sink faucet, or in public drinking fountains. Again, with these applications the volume meter can be an integral part of the main plumbing instead of an add-on.

With reference to FIGS. 2 and 3, the volume meter 11 includes a main body or water pipe fitting 23 defining a water flow path 25 therethrough. The flow path 25 expands in a central cavity portion 27 of the fitting 23 to a larger diameter so as to contain a turbine 29 with a magnetic insert 31. A retaining ring 33 adjacent to the female pipe threads on the inside of the fitting holds the turbine 29 in place in the cavity 27 whenever the volume meter 11 is not screwed onto pipe neck 15, in FIG. 1. Typically, fitting 23 is about 1 ½ inches (38 mm) long and has an inside diameter for flow path 25 of about ½inch (13 mm). Central cavity portion 27 has about a 1 inch (25 mm) diameter and the flow spaces around and through the turbine 29 preferably have a combined cross-sectional area which is substantially equal to that of flow path 25, i.e. about 0.196 square inches (127 mm$^2$). This keeps the turbine from acting as a flow restrictor. The dimensions given are merely exemplary for ordinary size household plumbing.

A magnetic pick-up coil 35 is mounted on the fitting 23, typically just outside of the turbine-containing central cavity 27. Pick-up coil 35 is electrically connected by wires 36 to an electronics card 37. Both the pick-up coil 35 and electronics card 37 are located in an annular electronics cavity defined by a cylindrical flange 41 extending from the fitting 23. Typically, flange 41 has a diameter of about 2 ½ inches (64 mm). A silicone based seal 43 keeps water out of electronics cavity 39. An annular sounding disk 45 has a piezoelectric transducer 47 physically attached to it and electrically connected by wires 48 through the seal 43 to the electronics card 37. Electronics components 49, including a microcontroller, determine when sounding disk 45 will produce an audible beep. Sounding disk 45 is typically welded to the fitting 23 outside of sealed electronics cavity 39.

In operation, turbine 29 freely floats within the enlarged flow cavity 27, and as the water flows past it, the turbine 29 is caused to rotate. The axis of rotation coincides substantially with the flow direction. Because turbine 29 has a magnetic insert 31 with at least two poles, labeled N and S, the magnetic flux produced by the insert 31 rotates as the turbine 29 rotates. Lines of flux cut through pick-up coil 35, which generates an electrical pulse signal in response. Electronics card 41 interprets the pulse signals to obtain a measure of the volume of water flowing through flow path 25.

With reference to FIG. 4, a turbine 29 includes a set of grooves 51 with a set of blade-shaped plateaus 53 therebetween, both defined on the turbine's circumferential surface. Typically, grooves and plateaus 51 and 53 are formed by injection molding of a plastic turbine piece. The grooves 51 widen asymmetrically at a water incoming end 55 such that one edge 57 of the plateaus 53 is substantially straight and the other edge 59 is curved. This asymmetry causes water flowing past the turbine to turn the turbine in the direction indicated by arrow A. The grooves 51 may also be aligned slightly askew with respect to the longitudinal flow direction to further rotate the turbine 29 in the direction A.

A through hole 61 is defined along the turbine's rotation axis Z. Addition of this through hole 61 contributes to the turbine's suspension within its holding cavity 27. An advantage of such suspension is the reduction or elimination of turbine-to-cavity contact during flow, resulting in quiet operation and low wear. Through hole 61 can also be formed with rifled helical grooves to further aid turbine rotation.

The retaining ring 33 has a central flow aperture 63 of a predetermined size Typically, this aperture size is about ½ inch (13 mm), i.e. the same as the inside pipe flow diameter However, the aperture 63 can also be a flow restricting aperture limiting the maximum flow rate. Since each water district has its own regulations regarding the maximum permissible flow rate, the retaining ring can be changed by the distributor to one of a different aperture size to meet local requirements. Through hole 61 should have a smaller diameter than the aperture 63 so that at least some water flows around the outside of turbine 29.

With reference to FIGS. 5 and 6, the turbine 29 rotates during flow and has an embedded magnet 31a or 31b. The magnetic inserts 31a and 31b can be configured with a selected number of poles 65 or 67, respectively. In the turbine in FIG. 5, the insert 31a has 8 poles, and in the turbine of FIG. 6, the insert 31b has 16 poles. The poles alternate between north and south. As the turbine rotates in response to water flow, the various poles pass the pick-up coil 35 in FIG. 2, and the alternating magnetic flux produced by the insert 31a or 31b cuts through the coil causing the coil to generate electrical pulses. The pulses are generated at a rate equal to the number of alternations of the magnetic field, and accordingly at a rate which corresponds to the rotation rate of the turbine and the number of poles on the insert. A turbine with twice as many magnetic poles on its insert, compared to another, will cause the generation of twice as many electrical pulses by the pick-up coil per revolution.

Turbine 29 is a component which can be installed by a distributor or even by a consumer after assembly of the remainder of the device by a manufacturer. Since the number of magnetic poles in a turbine determines the rate at which electrical pulses are generated, and since the number of pulses relates to the volume of fluid that will be dispensed, selecting and installing one turbine instead of another with a different number of poles determines the volume of water which will be dispensed before an alarm signal is sounded. For example, a turbine with the eight pole insert 31a in FIG. 5, if selected and installed in the volume meter adaptor in FIG. 2, might sound off when 22 gallons (83 L) of water have been dispensed, while a turbine with the sixteen pole insert 31b in FIG. 6 would cause sound-off at the 11 gallon (42L) threshold. An advantage is that a volume meter can be adapted for different locations or situations without requiring user input controls that would involve entry into the moisture sealed electronics cavity.

With reference to FIG. 7, an alternative turbine construction 71 has helical channels 73 on the circumferential surface instead of the asymmetric grooves. Typically, channels 73 are formed by rifling, although they could also be formed by injection molding. As in the embodiment in FIG. 4, fluid flow causes the turbine 71 to rotate about its longitudinal axis 75 substantially parallel to fluid flow in a direction indicated by arrow B. The turbine 71 is not shown to have a through hole through its center. Such through holes are preferred, but optional, and function to keep the turbine suspended in the flow path away from the inside walls defining the flow path.

With reference to FIG. 8, the magnetic pick-up coil 35 connects via wires 36 to an electronics card 37 containing a ROM programmed microcontroller 49 and other components. The card 37 likewise connects to a piezoelectric transducer 47 via wires 48. The pick-up coil 35 in combination with the electronics card 37 shown functions both as a tachometer for determining volume of water dispensed, and as an alternator for generating the necessary electrical power for microcontroller 49.

A tachometer line 77a connects to wire 36 and receives from the coil 35 an alternating current pulse signal 78. Tachometer line 77a connects through a resistor 79 to a zener diode 81. Zener diode 81, situated between line 77a and ground, limits the developed potential to that which is safely required by the microcontroller chip 49. Typically, this voltage is about 3.3 volts. A second portion 77b of the tachometer line connects the first portion 77a and zener diode 81 to an input 83 of microcontroller 49, and carries a half-wave rectified pulse signal 82 thereon to the microcontroller 49.

A bridge diode 85 is made up of four diodes 87a–d arranged in a diamond with two central input nodes 89 and 90 connected to wires 36 from pick-up coil 35 and top and bottom output nodes 91 and 92 connected to a power line 97 and ground, respectively. Bridge diode 85 produces a full-wave rectified pulse signal 94 which is then smoothed out to a nearly constant voltage signal 98 by a capacitor 95. Capacitor 95, connected between power line 97 and ground also stores the operating supply voltage so that the microcontroller chip 49 may continue to operate for several minutes after flow has stopped. Power line 97 connects via a resistor 99 and power input line 103 to a power input 105. A zener diode 101 connected between power input line 103 and ground limits the developed potential to that safely required by the chip, typically about 4.7 volts. The potential on power input 105 defines the drain reference voltage $V_{DD}$ for transistor elements in the microcontroller 49. The source reference voltage $V_{SS}$ input 107 is connected to ground. Typically, microcontroller 49 is a CMOS device to limit overall power consumption.

An oscillator 109 supplies a periodic clock signal 110 to clock inputs 111 and 112 of microcontroller 49. Typically, oscillator 109 generates a 32kHz clock signal.

A piezoelectric transducer 47 attached to a ceramic sounding disk prompts the user either with a polite beep or a more aggressive alarm. An output 115 of the microcontroller 49 generates a control signal BEEP on control line 117 to turn the audible alarm on or off. The transducer circuit is configured to function in a self-resonant mode to yield maximum displacement, i.e. a very loud alarm, at low power drive levels. The drive power is supplied by power supply line 97 along a drive line 119 with a load resistor 120. A transistor 122 has a base connected to control line 117, a collector connected to drive line 119, and a grounded emitter. When control signal BEEP is high, transistor 122 is on, effectively grounding the drive line 119. The transducer 47 receives no potential on wires 48 and does not beep. When control signal BEEP is low, transistor 122 first switches off. Power is supplied on wires 48 to drive the transducer 47. Feedback from wires 48 to the transistor base via resistor 124 switches the transistor 122 back on, repeating the cycle. The resulting drive signal 126 on drive line 119 and wires 48 oscillates, causing an audible output from transistor 47. Other oscillator circuits could also be used.

The microcontroller 49 has a reset terminal 129 connected to a reset circuit. The circuit comprises the capacitor 95, connected between power line 97 and ground, the resistor 99 and a resistor 131 connected in series from the power line 97 to a first input terminal 135 of a comparator 133, a resistor 137 connected from the power line 97 to a second input terminal 139 of comparator 133, a hysteresis-producing resistor 141 connected from an output terminal 143 of comparator 133 to first input terminal 135, and the comparator 133 whose output terminal 143 is also connected to the reset input 129 of microcontroller 49.

Comparator 143 compares the voltages present on input terminals 135 and 139 and produces an output signal RESET on output terminal 143. During fluid flow, the two input voltages are normally different since the terminals 135 and 139 are connected to power line 97 with a non-zero voltage. Terminal 135 is limited to zener voltage of diode 101 while terminal 139 is allowed to rise above the zener voltage and at a function of the turbine turn rate. Accordingly, the comparator output RESET is normally high, and reset does not take place. When the flow is turned off, capacitor 95 assures that the operating supply voltage on power line 97 is maintained so that the microcontroller 49 may continue to operate for several minutes. The comparator 133 continues to output a high reset signal RESET for several minutes. The circuit is accordingly not fooled by a user turning the shower off for a few seconds or even a minute in order to allow another allotted volume of water to be delivered. Eventually, the supply voltage will decay enough to cause the comparator signal RESET to go low. When the shower is again turned on, the microcontroller 49 will reset its program to start.

With reference to FIG. 9, microcontroller 49 may be a masked ROM programmed logic chip. For example, a COP400 series chip manufactured by National Semiconductor Inc. may be used. The chip is programmed to carry out the procedure shown here in flow diagram form. The program begins when the water is turned on (step 145) and a reset event takes place (step 147). The program continues to operate in a loop until water has been turned off for several minutes and power can no longer be supplied to the microcontroller. If the water is turned back on before sufficient time has elapsed for a reset event to take place the program continues accumulating the measured volume where it left off. Whenever a reset event takes place, the accumulator is cleared (step 149). The accumulator is a register in the microcontroller that keeps track of the total volume of water used, and clearing the accumulator resets the measured volume to zero.

The microcontroller 49 polls the tachometer port 83, seen in FIG. 8, for a tachometer event or pulse (steps 151 and 152). If water flow has recently been turned off, no pulses will be found (condition 153) and the microcontroller 49 will continue to look until it runs out of power or water is turned back on. If pulses are found (condition 155), the microcontroller 49 will use clock inputs 111 and 112, seen in FIG. 8, to determine the rate (tach. pulses/sec.) at which pulses arrive at input port 83 and using a ROM look-up table, will determine the volume rate at which water is flowing (step 157). The look-up table is represented in FIG. 9 by a graph in box 157. The tachometer pulse to flow volume relationship is generally non-linear, but it can be determined experimentally for each device type. Once characterized the relationship can be programmed into the microcontroller's ROM in the form of a look-up table.

Once the volume flow rate is known for any given interval, the accumulator is updated by adding the calculated volume delivered during that interval (step 159) The accumulated volume is compared with a first desired volume level y to determine whether or not the volume dispensed so far exceeds that level (step 160). If the desired volume level y has not yet been exceeded (condition 161) the program returns to tachometer port polling (step 151). If the desired volume level y has been exceeded (condition 163), the accumulated volume is compared with a second desired level y+z to determine whether or not the volume dispensed exceeds the second level (step 164). If the second level y+z has not been exceeded (condition 165) a polite signal in the form of a sequence of short duty cycle beeps is sounded by the piezoelectric transducer 47, in FIG. 8, (step 169) and the program returns to polling the tachometer port (step 151). Alternatively, the polite alarm could be in the form of a musical tune. If the second level y+z has been exceeded (condition 167) a more aggressive alarm in the form of a continuous sound from the transducer 47 is made (step 171). The tachometer port 83 continues to be polled (step 173) to determine whether or not pulses continue to be received (step 175). If so, the alarm continues to sound (step 171). If not, the program returns to polling the tachometer port (step 151) and the alarm stops. If the water is turned on again however, the program will continue down to step 171, restarting the alarm. Only when the water has been off for several minutes so that a reset signal is generated (step 147) will the microcontroller be reset and thus the accumulator cleared. Alternatively, the aggressive alarm could be combined or replaced with a telemetry link to a shut-off valve to automatically turn the water off after y+z units have been delivered. In that case, the polite alarm would serve as advance warning and the aggressive alarm as an imminent warning of water shut-off.

While the alarm signal has been described as an audible sound, the alarm could also be in the form of a flashing light, a combination of light and sound, an indication of the volume or time remaining before water shut-off or aggressive alarm, even a small but noticeable change in water temperature. A preferred alarm is the audible sound because it cannot easily be ignored or misinterpreted.

With reference to FIG. 10, an alternative volume meter embodiment 177 is seen. While those volume meters which employ rotating magnetic turbines and pick-up coils like that described above are preferred, a principle aspect of the present invention is simply an adapter for a water dispenser which signals the user whenever a predetermined volume of water has been delivered, regardless of the way in which the volume is actually measured. Another way to measure the fluid flow rate, and thus the volume itself, is to use the venturi effect. When a fluid flows through sections of pipe with different diameters, the resulting water pressure also differs in a known way. The adapter embodiment 177 in FIG. 10 includes a fluid flow path 179 defined by the adapter body 181. The body 181 is similar in many respects to that seen in FIG. 2 in that it has a sealed electronics cavity 183 and a piezoelectric sounding disk 185 around a central pipe portion with male and female pipe threads 187 and 188. The pipe portion has an inside diameter which varies from a large diameter in at a first end 189 to a smaller diameter in a central section 191 and back to a large diameter at the opposite end of a flow path 179. Bores 193 and 194 extend from the sections 189 and 191, respectively, to a piezoresistive silicon die 196. A first pressure $P_1$ is found in bore 193, while a second pressure $P_2$ is found in bore 194. When the pressures $P_1$ and $P_2$ are equal there is no fluid flow. When fluid flows, a pressure differential is created which is proportional to the fluid velocity. The piezoresistive die 196 creates an electrical voltage which corresponds to the flow velocity. This electrical voltage is analyzed by electronics components in the sealed cavity 183. The microcontroller works as above except that the electrical voltage is analyzed instead of pulse rates to determine the fluid flow rate and thus the accumulated volume. A tachometer event is indicated by non-zero voltages from the piezoresistive die 196. Again, the unit gives an audible signal or other alarm when the accumulated volume use has exceeded a predetermined value, indicating to a shower user that the water should be turned off.

I claim:

1. A self-contained volume meter for a fluid dispenser comprising, a body member having inlet means for attaching said body member to a source of fluid, said body member having an outlet and a flow path from said inlet means to said outlet, means within said path and responsive to fluid flow within said path for generating a magnetic flux rotating at a rate corresponding to a fluid flow rate, pickup means receiving said magnetic flux and structurally associated with said body member for producing electrical signal pulses at a rate corresponding to said magnetic flux rotation rate, means in electrical communication with said pickup means for supplying electrical power from said fluid flow through path, means in power-utilization relation with said supply means and in pulse-receiving relation with said pickup means for calculating a volume of fluid flowing through said path, means receiving power from said supply means for comparing said calculated volume with a desired total volume, and alarm means in electrical power-receiving communication with said supply means for indicating when said calculated volume has reached said desired total volume, said alarm means being attached to said body member.

2. The meter of claim 1 wherein said alarm means also indicates when said measured volume has approached to within a predetermined amount of said desired total volume.

3. The meter of claim 1 wherein said alarm means provides an audible signal.

4. The meter of claim 1 wherein said fluid dispenser is a water shower head attached to said outlet of said body member.

5. A flow volume meter for attachment between a water pipe and a shower head comprising, a water pipe fitting having an outlet means for attaching a shower head, rotatable means within said fitting responsive to water flow within said fitting for metering said water flow, said rotatable means having magnetic means for generating a magnetic flux rotating at a rate corresponding to a rate of said water flow, pick-up means receiving said magnetic flux for producing electrical signal pulses at a rate corresponding to said magnetic flux rotation rate and for generating electrical power, means responsive to said electrical signal pulses and receiving electrical power from said pick-up means for calculating an accumulated volume measure of water passing through said fitting, and alarm means attached to said fitting and in electrical power-receiving relation with said pick-up means for indicating when a predetermined volume of water has passed through said fitting.

6. The flow volume meter of claim 5 wherein said alarm means further indicates when a second predetermined volume of water has passed through said fitting.

7. The flow volume meter of claim 5 wherein said alarm means provides an audible signal.

8. A flow volume meter comprising, a water pipe fitting, a turbine disposed within said fitting rotatably responsive to water flow within said fitting, said rotatable turbine having magnetic means for generating a magnetic flux rotating at a rate corresponding to a rate of said water flow, said turbine having an axial through hole therein such that said turbine floats freely within said fitting, pick-up means receiving said magnetic flux for producing electrical signal pulses at a rate corresponding to said magnetic flux rotation rate and for generating electrical power, means responsive to said electrical signal pulses and receiving electrical power from said pick-up means for calculating an accumulated volume measure of water passing through said fitting, and alarm means for indicating when a predetermined volume of water has passed through said fitting.

9. The flow volume meter of claim 8 wherein said turbine has helical channels formed in a circumferential surface thereof with a predetermined pitch corresponding to a desired rotation rate to flow rate.

10. The flow volume meter of claim 8 wherein said turbine has alternating grooves and plateaus defined along a length of a circumferential surface thereat, said plateaus having at a flow input end and asymmetric curvature on one edge thereof.

11. The flow volume meter of claim 8 wherein said turbine has a predetermined number of magnetic poles so as to produce a desired number of electrical signal pulses per turbine revolution.

* * * * *